United States Patent [19]

Hatanaka

[11] Patent Number: 4,873,597
[45] Date of Patent: Oct. 10, 1989

[54] HEAD PLATE OPERATING MECHANISM FOR CASSETTE TAPE PLAYER

[75] Inventor: Ryousuke Hatanaka, Sayama, Japan

[73] Assignee: Nihon Technical Kabushiki Kaisha, Japan

[21] Appl. No.: 12,359

[22] Filed: Feb. 9, 1987

[30] Foreign Application Priority Data

Jun. 23, 1986 [JP] Japan ................................ 61-144745

[51] Int. Cl.⁴ .............................................. G11B 5/54
[52] U.S. Cl. ................................................... 360/105
[58] Field of Search ................... 360/88, 90, 93, 96.5, 360/105, 109, 104, 137, 96.1, 96.5, 96.4

[56] References Cited

U.S. PATENT DOCUMENTS

| | | | |
|---|---|---|---|
| 4,319,295 | 3/1982 | Motoyama et al. ................. | 360/137 |
| 4,527,210 | 7/1985 | Takamatsu .......................... | 360/105 |

FOREIGN PATENT DOCUMENTS

| | | | |
|---|---|---|---|
| 0141046 | 9/1982 | Japan ................................... | 360/105 |
| 0176556 | 10/1982 | Japan ................................... | 360/93 |

Primary Examiner—Robert S. Tupper
Assistant Examiner—Andrew L. Sniezek
Attorney, Agent, or Firm—Bruce L. Adams; Van C. Wilks

[57] ABSTRACT

A head plate operating mechanism for a cassette tape player has a head plate carrying a magnetic head and movably mounted on a frame for movement between non-play and play positions. A power-assisting notched gear having a crank pin on a rotation surface thereof rotates when a tape cassette is loaded into the player. A slide member movably connected to the head plate is actuated to move by slidably contacting with the crank pin of the rotating notched gear and restrains the head plate in its non-play position when the slide member is in its non-actuated state but releases the head plate so as to allow the movement of the head plate between the non-play and play positions when the slide member has been actuated by the crank pin. A locking mechanism releasably locks the slide member in its actuated state, and a control member connected to the head plate is actuated by slidably contacting with the crank pin of the rotating notched gear so as to effect displacement of the head plate from the non-play position to the play position with a time lag after the slide member has been actuated by the crank pin and locked in its actuated state by the locking mechanism.

9 Claims, 11 Drawing Sheets (A)

(B)

(C)

HEAD PLATE OPERATING MECHANISM FOR CASSETTE TAPE PLAYER

BACKGROUND OF THE INVENTION

The present invention relates to a head plate operating mechanism for a cassette tape player which can safely load a tape cassette thereinto.

In the past, in loading a tape cassette (hereinafter merely referred to as cassette) into a cassette tape player (hereinafter merely referred to as player), mechanical means are merely used or a switch is electrically turned on so that a magnetic head (hereinafter merely referred to as head) is moved toward the cassette by means of a motor or a solenoid. According to this conventional system, there is a disadvantage in that an undesirable timing lag sometimes occurs between operations closely related to each other due to mechanical play or looseness, and the head is moved, before the cassette is completely set in the player, with the result that an accidental collision occurs between the head and the cassette.

SUMMARY OF THE INVENTION

To overcome the inconvenience noted above with respect to the conventional operating mechanism, the present invention is intended to provide an arrangement wherein after the cassette has been completely set into the player, the head is moved toward the cassette, whereby interference between the head and the cassette is prevented. The subject matter of the present invention is as follows: More specifically, in a first embodiment, there are provided a transmission gear which initiates its rotation in response to loading a cassette into a player, and a notched gear capable of being meshed with the transmission gear. The transmission gear is rotated when the cassette is loaded into the player, and an electro-magnetic actuator is actuated to impart a starting turning effort or a starting torque to the notched gear through a starting mechanism so that the notched gear is meshed with the transmission gear being rotated to continue rotation thereof, whereby a slide member is urged to move by an operating or crank pin provided on the notched gear to increase the resilient force of a cassette holder returning spring connected to the slide member. This state is maintained by a first lock mechanism including a first electromagnetic member, and subsequently, the notched gear is further rotated to press the operating or crank pin against a control member, which is connected to carry a head plate and normally urged toward the notched gear by means of a spring, to guide the head plate from its non-play position to its play position, whereby the head plate is accurately set in the play position by mean of a setting element. After the control member has moved beyond its maximum displaced position by the pressure contact of the operating pin, the rotation of the notched gear is restrained. This state is maintained by a second lock mechanism. A cassette ejecting operation is carried out by releasing the electromagnetic actuator from its energization and first and second lock mechanisms to return the head plate to the non-play position and subsequently ejecting the cassette from the cassette holder by the resilient force of the returning spring. It is noted that the second lock mechanism is adapted to be able to release the notched gear from its rotation-restrained state even when a non-play operation other than the ejecting operation, such as quick feed or rewinding operation, is carried out.

As described above, according to the first embodiment, a single rotatively moving operating pin or a crank pin is used to actuate a slide member against the urging force of a cassette holder returning spring and successively a control member to guide a head plate to its play position. Therefore, the head plate operating mechanism of the first embodiment has various advantages such that the operation is positive and the stabilized play state may be maintained; in the ejecting operation, the slide member is restored to its non-actuated state, after the head plate has been restored to the non-play state, to effect the operation of restoring the cassette holder, and therefore, no mechanical damage occurs on either of the cassette or the head.

An object of a second embodiment is to provide a light-weight and inexpensive player in which an improved first lock mechanism for holding the biasing force of the cassette holder returning spring in the arrangement of the aforementioned first embodiment is mechanically constructed without use of the electromagnetic member.

BRIEF DESCRIPTION OF THE DRAWINGS

The drawings show embodiments of the present application. FIG. 1 is a plan view showing the relationship between a frame and a head plate; FIG. 2 a plan view during the time of non-play with the frame and head plate omitted; FIG. 3 is a plan view when a starting mechanism is actuated in FIG. 2; FIG. 4 is a plan view when a slide member is actuated in FIG. 3; FIG. 5 is a plan view during the time of play in which a control member is actuated in FIG. 4; and FIG. 6 is a plan view at the time of quick-feed and rewinding.

FIG. 9 is a plan view showing the relationship between a frame and a head plate; FIG. 10 is a plan view during the time of non-play with the frame and head plate omitted; FIG. 11 is a plan view at the time of play; FIG. 12 is a sectional view taken on line I—I of FIG. 10; and FIGS. 13A to 13C are views showing the process of operation of a third lock mechanism.

DETAILED DESCRIPTION OF THE PREFERRED EMBODIMENTS

Figure 1:
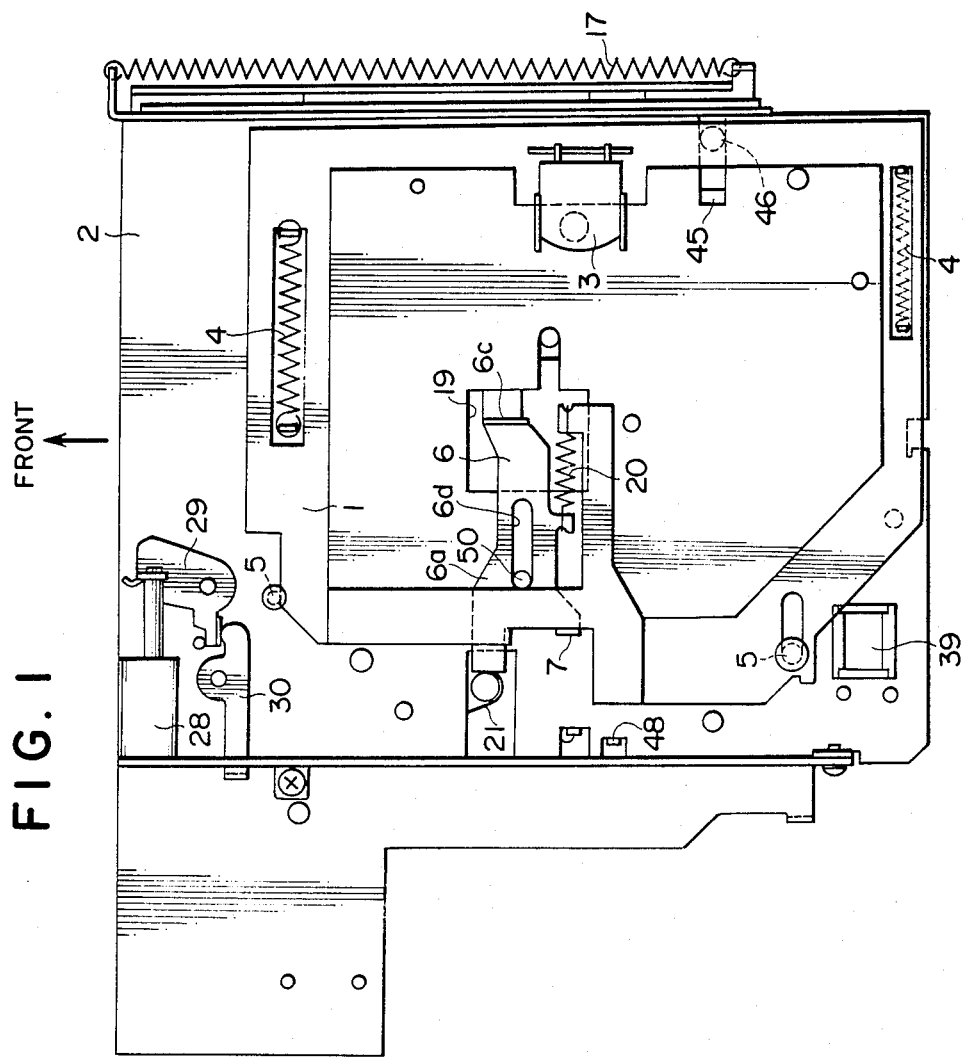
FIGS. 1 to 6 illustrate a first embodiment.
Figure 2:
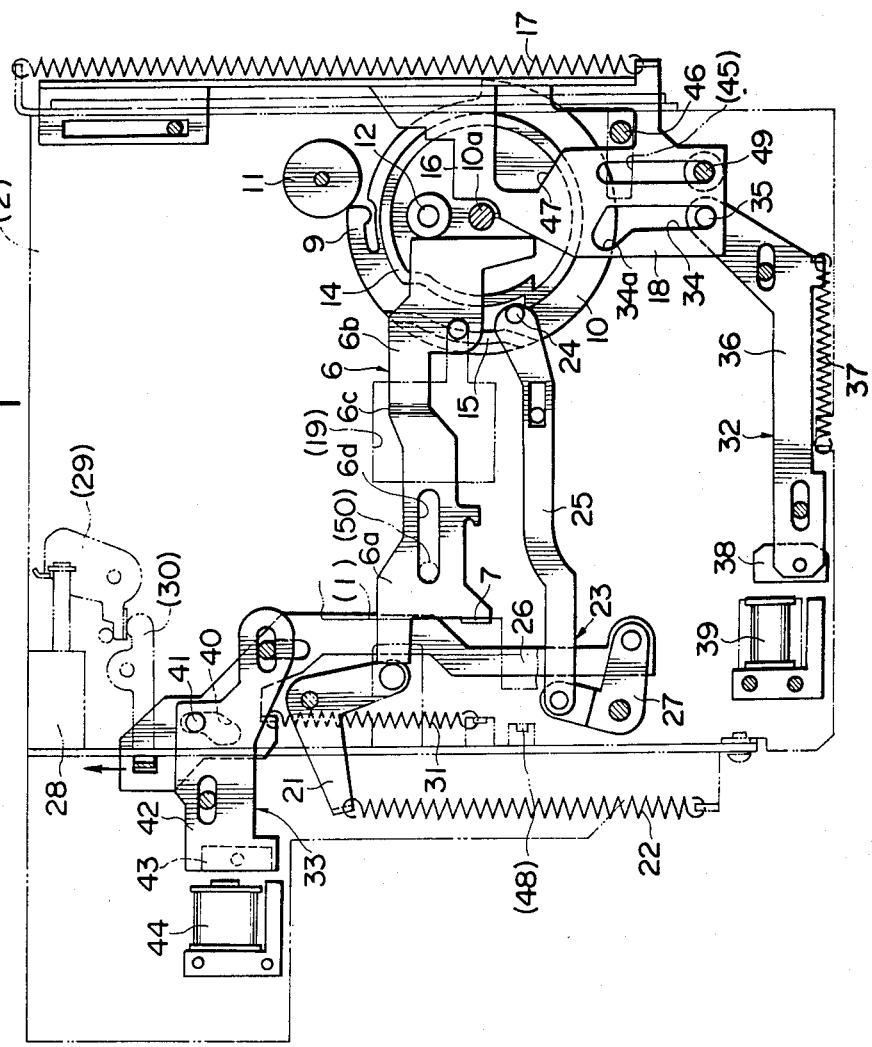
Figure 4:
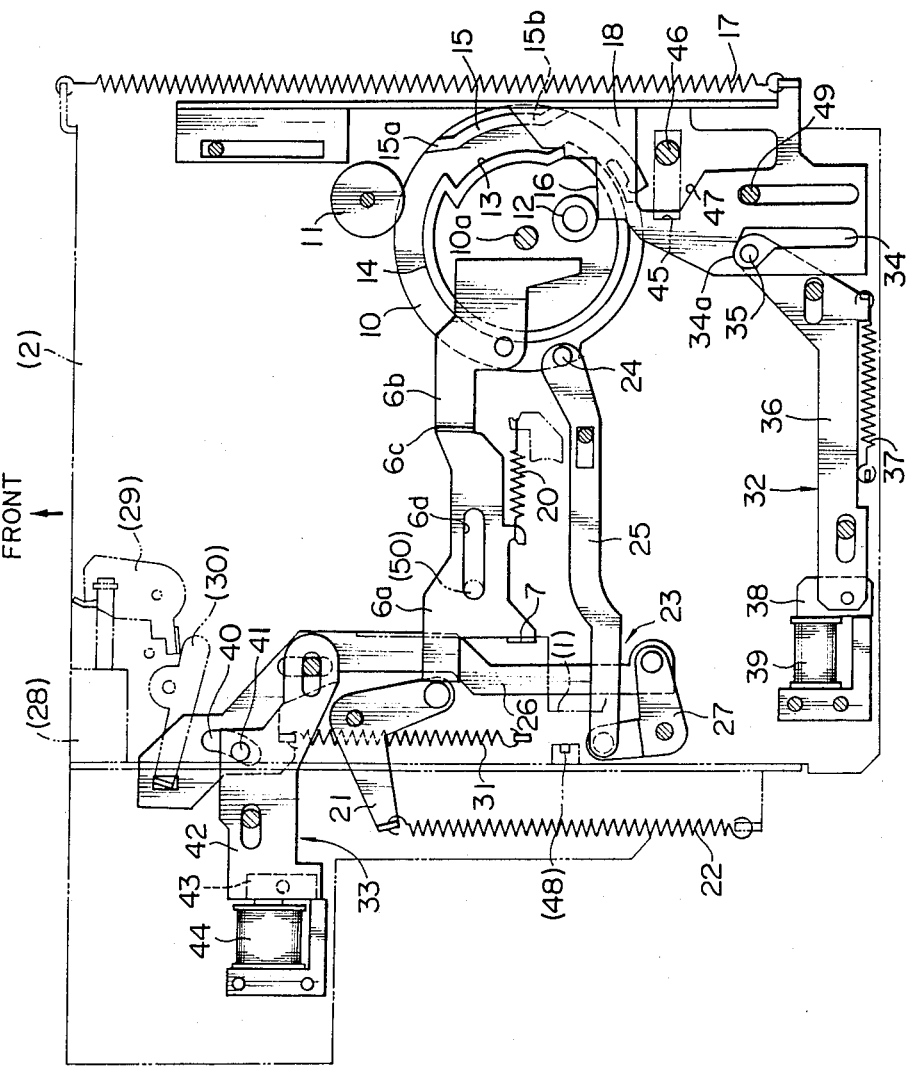

The first embodiment of the present invention will now be described in detail with reference to the drawings. FIG. 1 is a plan view principally showing the relationship between the frame and the head plate in the non-play state; and FIG. 2 is a plan view showing the frame by broken lines, omitting the head plate and showing the mechanism of the present invention disposed on the underside of the frame. Referring to FIG. 1, a head plate 1 is arranged so that it may be moved in a lateral direction on the surface of a frame 2. The head plate 1 is formed of a flat plate in the form of a generally square whose middle portion is removed. The head plate 1 is provided in the central portion on the right side thereof with a head 3 and at front and rear positions with a pair of springs 4, respectively. The springs 4 are retained under tension between the head plate 1 and the frame 2 and adapted to always bias the head plate 1 leftward as viewed in the drawing, that is, in a play direction, and a guide pin 5 for guiding the head plate 1 to move leftward and rightward as viewed in the drawing is provided on the frame 2. The head plate 1 is restrained from its leftward movement as viewed in the drawing by means of a stopper 7 provided on a control member 6, which will be described later, and is normally held in a non-play position. As shown in FIG. 2, a notched gear 10 having in a part of the outer periphery thereof a notched portion 8 and a resilient portion 9 operatively connected to the notched portion 8 in a rotational direction, and a transmission gear 11 which confronts the notched portion 8 in the non-play state and is rotated by a known driving motor (not shown in the drawings), when a cassette is loaded into the player, to mesh with and rotate the notched gear 10 are arranged on the underside of the frame 2 so that they are one-sided in a rightward position as viewed in the drawing of the frame 2. The notched gear 10 is provided on a rotation surface thereof with an operating pin or a crank pin 12 at a position slightly away from a rotating center portion 10a, a concentric circular guide ring 14 having a curved portion 13 in a part of the outer periphery thereof, and a control member 15 confronting the curved portion 13 and having inclined portions 15a and 15b at the respective one of opposite ends thereof as shown in FIG. 4.

On the underside of the frame 2 are provided a slide member 1 which is mounted movably in the backward direction in the drawings (the forward direction is indicated by an arrow mark on the drawings), has an abutting portion 16 formed on the forward end thereof and capable of abutting against the operating pin 12 of the notched gear, is normally retained in a forwardly biased state by means of a cassette holder returning spring 17 and is actuated backward as viewed in the drawing, when the notched gear 10 is rotated and the operating pin 12 abuts against the abutting portion 16, to increase the resilient force of the returning spring 17 but is restrained from further backward movement by means of a stopper pin 49; and a control member 6, which extends generally perpendicularly to the slide member 18, is arranged so that the right side thereof is superposed on the rotation surface of the notched gear 10 and being movable in a lateral direction as viewed in the drawing. The control member 6 has a stopper 7, an upward bent portion 6c provided in the central portion along its lengthwise, and left half and right half portions 6a and 6b which stand on different horizontal levels, said left half portion 6a being disposed so as to extend onto the upper surface of the frame 2 out of a square hole 19 formed generally in the center of the frame 2, said left half portion 6a being formed with a slot 6d. Between the control member 6 and the head plate 1 is provided a spring 20 stronger than the spring 4 in order to maintain pressure contact between the stopper 7 and the left side edge of the head plate 1. The control member 6 has its left end always biased rightward as viewed in the drawing by means of a spring 22 stronger then the spring 20 through an L-shaped lever 21 pivotably mounted on the frame 2, and the aforesaid biasing force causes the left end of the slot 6d to contact with a pin 50 provided on the frame 2 so that the had plate 1 is maintained in the non-play state against the spring 4 used to bias the head plate in the play direction. The control member 6 further has its right end which is urged leftward by means of the operating pin 12 as the notched gear 10 rotates. A starting mechanism 23 for imparting a starting turning effort or a starting torque to the notched gear 10 to thereby engage the notched gear with the transmission gear 11 comprises a elongated first lever 25 which is movable leftward and rightward as viewed in the drawing and provided at one end thereof with an action pin 24 located between the curved portion 13 of the guide ring 14 provided on the notched gear 10 and the control member 15 and acting with the inclined portions 15a and 15b of the control member 15 during operation; a lengthy second lever 26 mounted movably perpendicular to the first lever 25; a pivotal lever 27 which connects the other end of the first lever 25 and one end of the second lever 26 to convert the longitudinal movement, as viewed in the drawing, of the second lever 26 into the lateral movement, as viewed in the drawing, of the first lever 25; an electromagnetic actuator 28; a first pivotal member 29 which is pivotally moved when the electromagnetic actuator 28 is operated; a second pivotal member 30 which is pivotally moved by the pivotal movement of the first pivotal member 29 to displace the second layer 26 so as to bring the action pin 24 of the first lever 25 into pressure contact with the one inclined portion 15a of the control member 15; and a spring 31 mounted between the second lever 26 and the frame 2 to resiliently urge the first lever 25 in a direction in which the action pin 24 is moved away from the control member 15. The frame 2 is equipped on the underside thereof with a first lock mechanism 32 whereby, when the slide member 18 has been actuated backward as viewed in the drawing by the operating pin 12 as the notched gear 10 rotates, the slide member 18 is locked in its actuated state; and a second lock mechanism 33 whereby, when the action pin 24 of the starting mechanism 23 has come into pressure contact with the one inclined portion 15a of the control member 15 to impart the starting turning effort to the notched gear 10, the starting mechanism 23 is locked in its operative state.

The first lock mechanism 32 comprises an action plate 36 having at one end thereof an engaging pin 35 which is slidably received in a longitudinally elongated slot 34 formed in the slide member 18, the forward end portion of the slot 34 being inclined leftward as viewed in the drawings and served as an engaging portion 34a for releasably engaging therewith the engaging pin 35, a spring 37 for urging the action plate toward the left, an attraction member 38 attached to the other end of the action plate and a first electromagnetic member 39 which attracts the attraction member 38 against the biasing force of the spring 37 to maintain an engagement between the engaging pin 35 and the engaging portion 34a of the slot 34 to preclude restoration of the slide member 18 caused by the returning spring 17. The second lock mechanism 33 comprises a laterally movable lock plate 42 having an engaging pin 41 in engagement with a bent hole 40 formed in the second lever 26 and a second electromagnetic member 44 which attracts an attraction member 43 provided on an end of the lock plate 42 to preclude restoration of the second lever 26 caused by the spring 31.

The head plate is provided on the right side thereof with a pin-like engaging portion 46 which extends downward through a cross hole 45 formed in the frame 2, and the slide member 18 is provided with a notched portion 47 in which the engaging portion 46 is received and allowed to move together with the movement of the head plate 1 in the play direction in the state in which the slide member 18 has been moved backward as viewed in the drawing. On the frame 2 is provided a setting member 48 by which, before the control member 6 moves to reach its maximum displaced position relative to the axis 10a of the notched gear 10, the head plate 1 is stopped to be set in its proper play position.

Figure 7:
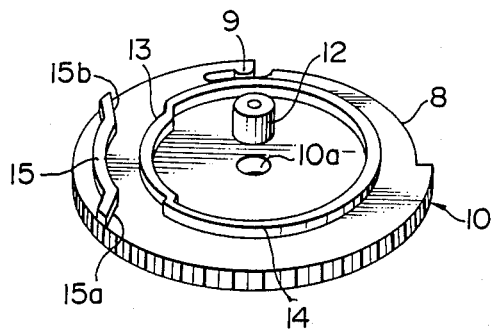
FIG. 7 is a perspective view of a notched gear in the first and second embodiments.
Figure 8:
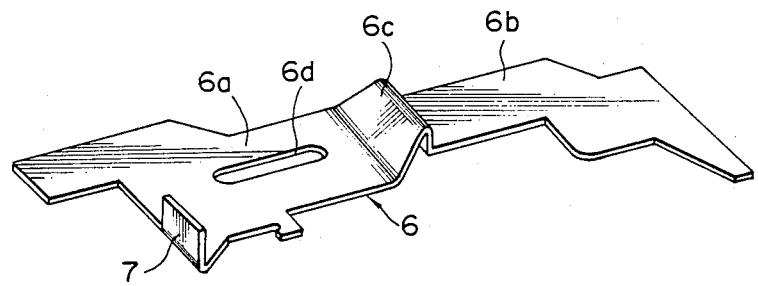
FIG. 8 is a perspective view of a control member in the first and second embodiments.
Figure 12:
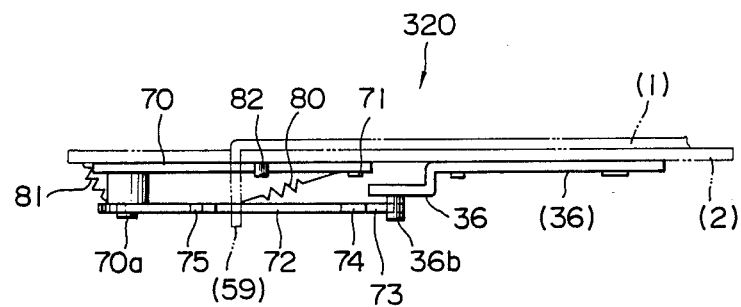
FIGS. 9 to 13 are concerned with a second embodiment.

The control member 15 on the notched gear 10 shown in FIG. 7 is designed so that when the starting mechanism 23 is in an inoperative position (FIG. 2), the one inclined portion 15a is opposed to the action pin 24, and the other inclined portion 15b comes into contact with the action pin 24 in the operating state of the starting mechanism 23 when the operating pin 12 has urged the right end of the control member 6 upon clockwise rotation of the notched gear 10 and passed a leftward maximum displacement position of said one end. The rotation of the notched gear 10 is stopped by contact of the action pin 24 with the other inclined portion 15b, and at that position the engagement between the notched gear 10 and the transmission gear 11 is released (see FIG. 5).

Although not shown, an electric control circuit is provided in a conventional technical procedure so that when a cassette tape is loaded, the first and second electromagnetic members 39 and 44 are energized and the electromagnetic members 39 and 44 are released in the ejecting operation; and the second electromagnetic member 44 is released in the quick-feed or rewinding operation.

With the above-described arrangement, when the cassette is loaded into the player when the player is in the non-play state shown in FIG. 2, the cassette holder (not shown) is moved to the play position, the first and second electromagnetic members 39 and 44 are energized and the electromagnetic actuator 28 is also temporarily actuated to pivotally move the first and second pivotal members 29 and 30 whereby the second lever 26 is moved forward in FIG. 2.

Then, the forward movement of the second lever 26 allows leftward movement of the lock plate 42 of the second lock mechanism 33, and the attraction member 43 is attracted by the second electromagnetic member 44. The first lever 25 is moved leftward as viewed in the drawing through the pivotal movement of the pivotal lever 27, the action pin 24 comes into pressure contact with the one inclined portion 15a of the control portion 15, and the notched gear 10 is started to rotate clockwise as viewed in the drawing by a torque component of the resultant pressure contact force. Thereby, the notched gear 10 meshes with the transmission gear 11 and continues its rotation, and the inclined portion 15a is moved away from the action pin 24.

Figure 3:
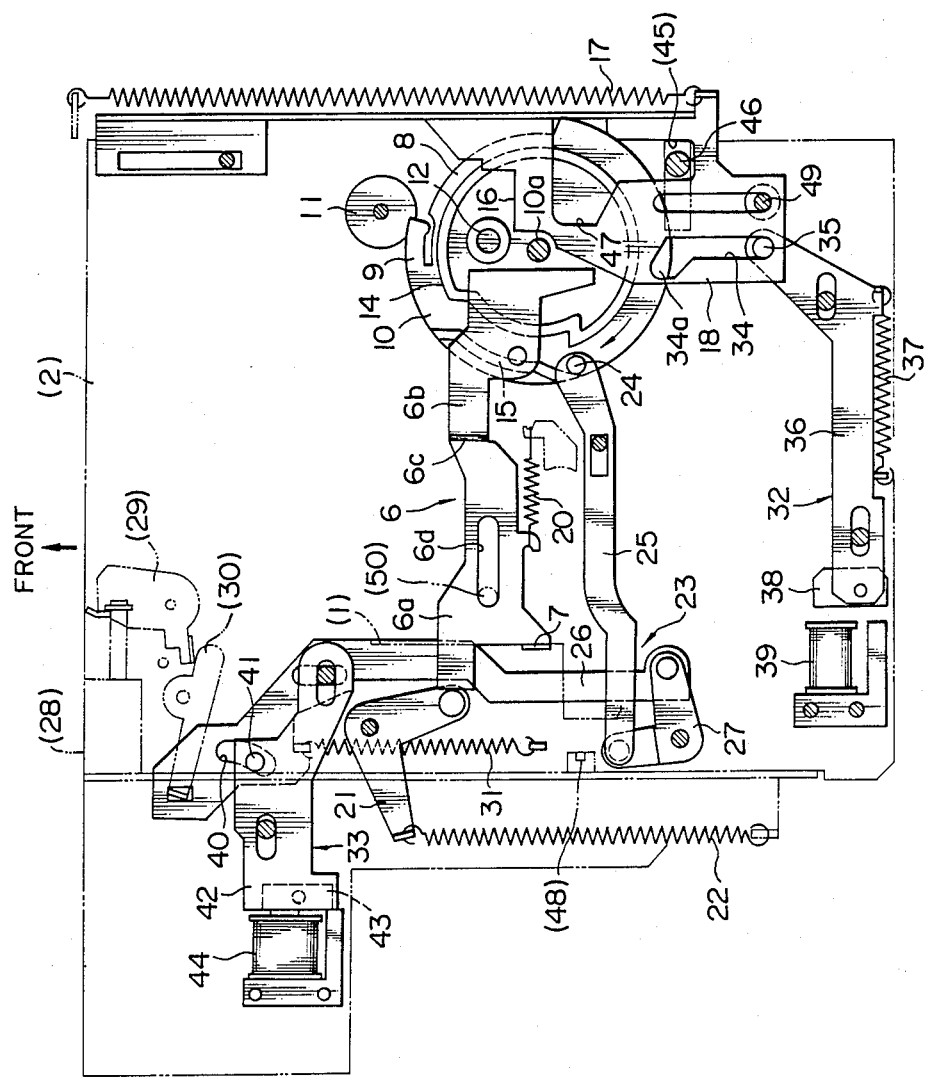

On the other hand, the state of leftward movement of the first lever 25 with forward movement of the second lever 26, that is, the operating state of the starting mechanism 23, is maintained by the lock plate 42 being attracted by the second electromagnetic member 44 (see FIG. 3).

Upon clockwise rotation of the notched gear 10, the operating pin 12 comes into abutment with the abutting portion 16 of the slide member 18 and then moves the portion 16 backward as viewed in FIGS. 3 and 4, whereby the resilient force of the cassette holder returning spring 17 is increased, and upon backward movement in the drawing of the slide member 18, the engaging pin 35 is engaged with the engaging portion 34a by the action of the spring 37. The attraction member 38 is attracted to the electromagnetic member 39 with leftward movement as viewed in the drawing of the action plate 36. That is, the backward state of the slide member 18 is maintained by the first lock mechanism 32 through the engagement between the engaging portion 34a and the engaging pin 35 and the attraction of the action plate 36 to the first electromagnetic member 39 (see FIG. 4).

The operating pin 12 urges the slide member 18 backward as viewed in the drawing, and thereafter the notched gear 10 is further rotated, whereby the control member 6 is then urged and moved leftward as viewed in the drawing. At the same time the control member 6 causes the lever 21 to pivotally move clockwise against the biasing force of the spring 22 and also causes the head plate 1 being in pressure contact with the stopper 7 by the action of the spring 4 to move leftward as viewed in the drawing at which time the engaging portion 46 provided on the head plate 1 is engaged with the notched portion 47 of the slide member 18.

Figure 5:
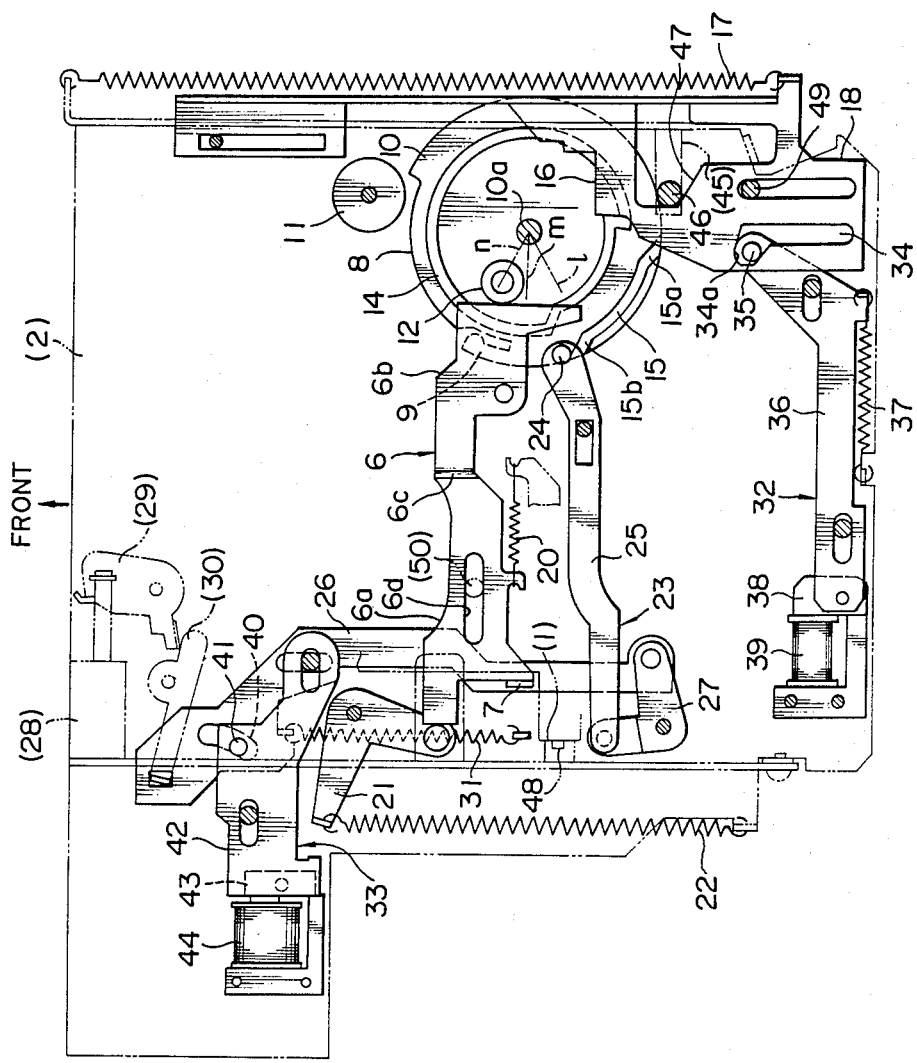
Figure 6:
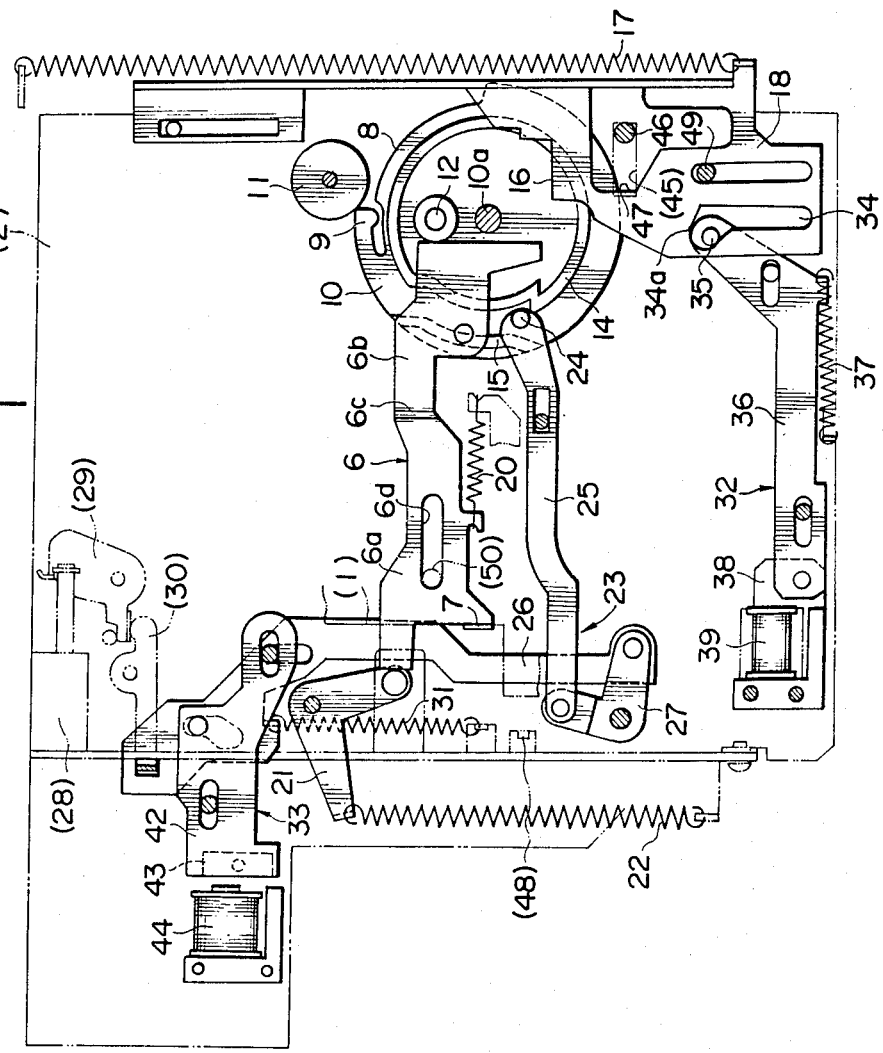

In this manner, in FIG. 5, when the operating pin 12 is positioned on an imaginary line m laterally aligned with the center portion 10a of the notched gear 10, the control member 6 reaches its maximum displacement position but when the operating pin 12 is positioned on an imaginary line 1 on this side of that position, the head plate 1 comes into contact with the setting member 48 to preclude further movement whereby the head plate 1 is set in the proper play position. On the other hand, the control member 6 is moved further leftward by the operating pin 12 during the time the operating pin 12 moves from the line 1 to the line m. At that time, the engagement between the notched gear 10 and the transmission gear 11 is released so that the notched gear 10 will not be rotated by the transmission gar 11, and the action pin 24 comes into abutment with the other inclined portion 15b of the control member 15. This abutting state is maintained by the fact that the starting mechanism 23 is locked by the second lock mechanism 33, and accordingly, the clockwise rotation of the notched gear 10 is restrained, in which state the resilient force of the spring 22 acting on the control member 6 is applied to the operating pin 12. This state is shown in FIG. 5, in which state the tape player starts playing.

Subsequently, when the quick-feed or rewinding operation is started from the play position shown in FIG. 5, the second electromagnetic member 44 is deenergized in connection with said operation. Then, the second lever 26 of the starting mechanism 23 is moved backward as viewed in the drawing by means of the resilient force of the spring 31, the first lever 25 is moved rightward so that the action pin 24 is moved away from the inclined portion 15b of the control portion 15, and at the same time the lock plate 42 is moved rightward to return to its original position through the engagement between the bent hole 40 and the engaging pin 41. That is, the restraint of the clockwise rotation of the notched gear 10 is released, and the notched gear 10 is rotated clockwise by the force of the sprinq 22 applied to the operatinq pin 12. The head plate 1 is also returned rightward against the biasing force of the spring 4 as the control member 6 moves rightward, and when the head plate 1 has been returned to the non-play position, the notched gear 10 stops in the state in which the resilient portion thereof is positioned closest to the transmission gear 11. This state is maintained by the fact that the action pin 24 is engaged with the end of the curved portion 13 by the biasing force of the spring 31 and the slide member 18 still remains locked by the first lock mechanism 32, which is similar to the non-play state shown in FIG. 2.

When, for example, a play operating button (not shown) is actuated, after the tape player has performed the quick-feed and rewinding operation, to return the mode from said operation to the play operation, the electromagnetic actuator 28 is temporarily operated to pivotally move the first and second pivotal members 29 and 30, and the second electromagnetic member 44 is energized to attract the attraction member 43.

As previously mentioned, the notched gear 10 is started to rotate, by the pressure contact between the action pin 24 and the one inclined portion 15a of the control member 15, and meshed with the transmission gear 11 to continue its clockwise rotation. Accompanied with the clockwise rotation of the notched gear 10, the control member 6 is moved leftward as viewed in the drawing by the operating pin 12 against the biasing force of the spring 22, the head plate 1 is also moved leftward and again set in the play position by the setting member 48. In the state in which the operating pin 12 is positioned on the line n in FIG. 5, the notched gear 10 is restrained from its clockwise rotation by the abutment between the action pin 24 and the other inclined portion 15b of the control member 15, and the tape player is again set in its play state.

When, for example, an ejection button (not shown) is actuated to perform an ejecting operation from the aforesaid state, the electric control circuit is disconnected, and the first and second electromagnetic members 39 and 44 are deenergized to release the slide member 18 from its locked state by the first lock mechanism 32 and the notched gear 10 from its restrained state by the second lock mechanism 33, respectively. By the release of the slide member 18 from its locked state, the spring 17 effects restoring of the cassette holder to its non-play position from its play position as well as returning the slide member to its non-actuated state, and various mechanisms are restored to their non-play states as shown in FIGS. 1 and 2.

In the above-described embodiment, the actuated slide member 18 is precluded from its forward movement as viewed in the drawing, prior to full restoration of the head plate 1 to the non-play position, by the engaging action between the engaging portion 46 and the notched portion 47, whereas after the head plate 1 has been fully restored to the non-play position, the forward movement of the slide member 18 as viewed in the drawing is allowed. Accordingly, the cassette holder is never restored to its non-play state under any imperfectly restored state of the head plate, and therefore, no possible mechanical damage occurs to either the head or the cassette.

Figure 10:
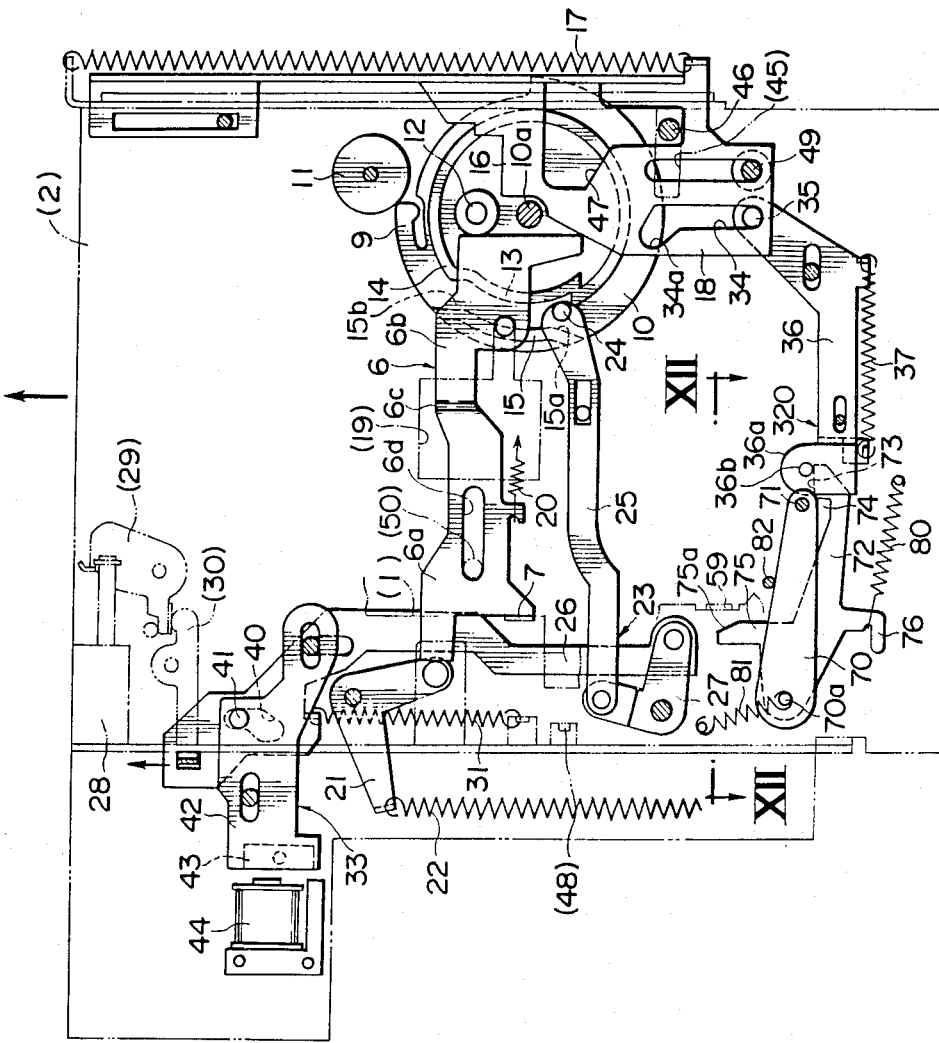
Figure 11:
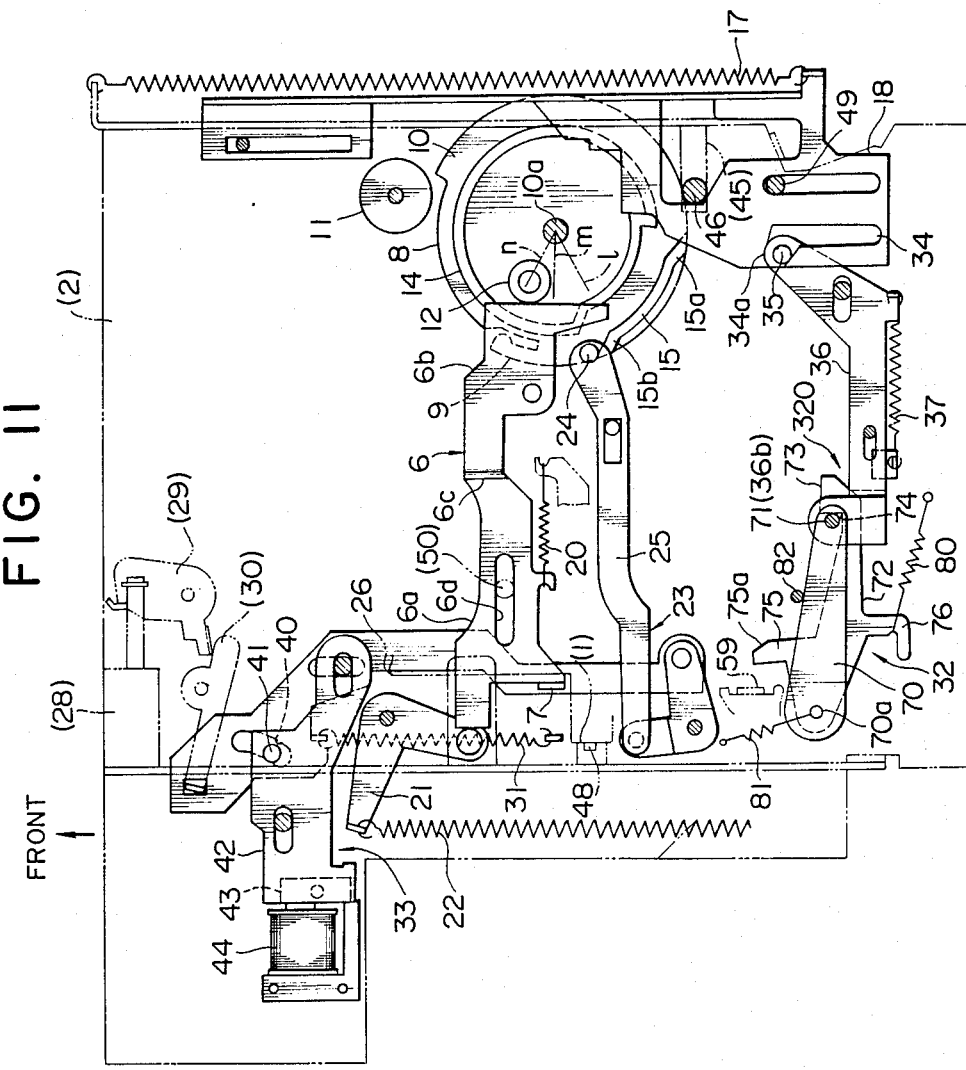

In the second embodiment, a third lock mechanism 320 is employed in which the first lock mechanism 32 in the aforementioned first embodiment is replaced by a pure mechanical structure without using the first electromagnetic member 39. That is, the action plate 36 forming one constituent element of the first lock mechanism 32 further has a projection 36a attached to the left end thereof on the plate surface having no engaging pin 35, said projection being generally parallel to and perpendicular to the action plate, and a pivot pin 36b projected from the projection 36a. A guide lever 70 having one end thereof pivotally mounted on the frame 2 by means of a pivot shaft 71 and extending parallel to the frame 2 is provided so that when the action plate 36 is moved from an inoperative position to an operating position, the pivot pin 36b of the action plate 36 is superposed on the pivot shaft 71 of the guide lever 70 at the same axial position leaving a space (FIGS. 10 and 11). An operating member 72 is pivotally mounted at one end thereof through a pivot shaft 70a on the free other end of the guide member 70 and extends inwardly of the frame 2, and the operating member 72 is formed at the other end thereof with a contact edge 73 which is adapted to contact with the pivot pin 36b provided on the projection 36a when the action plate 36 is in the inoperative state. Adjacent to the contact edge 73 and internally of the operating member 72 is provided an engaging shoulder 74 which is adapted to engage with the pivot pin 36b of the action plate 36 when the action plate 36 is in the operative state. Furthermore, in the intermediate portion of the operating member 72 are provided an action member 75 projected forward as viewed in the drawing and provided with an inclined edge 75a and a hook member 76 projected backward as viewed in the drawing.

A spring 80 for bringing the contact edge 73 into pressure contact with the pivot pin 36b on the projection 36a and a spring 81 for applying a pivotal force to the guide lever 70 are connected at one end thereof to the hook member 76 and the pivot shaft 70a, respectively and at the other ends to the frame 2.

On the inside of the frame 2 is also provided a guide pin 82 by which the guide lever 70 is restrained from its clockwise pivotal movement around the pivot shaft 71 against the biasing force of the spring 81.

The head plate 1 is provided with a projection 59 which slidably abuts against the action member 75 to exert a backward force on the operating member 72 when the head plate 1 is moved from the non-play position to the play position and vice versa.

Further, a conventional control circuit (not shown) similar to the electric control circuit in the first embodiment is provided so that when the cassette tape is loaded, the second electromagnetic member 44 is energized and the electromagnetic actuator 28 is temporarily actuated, but when the player comes into ejecting operation, the second electromagnetic member 44 is deenergized.

Figure 9:
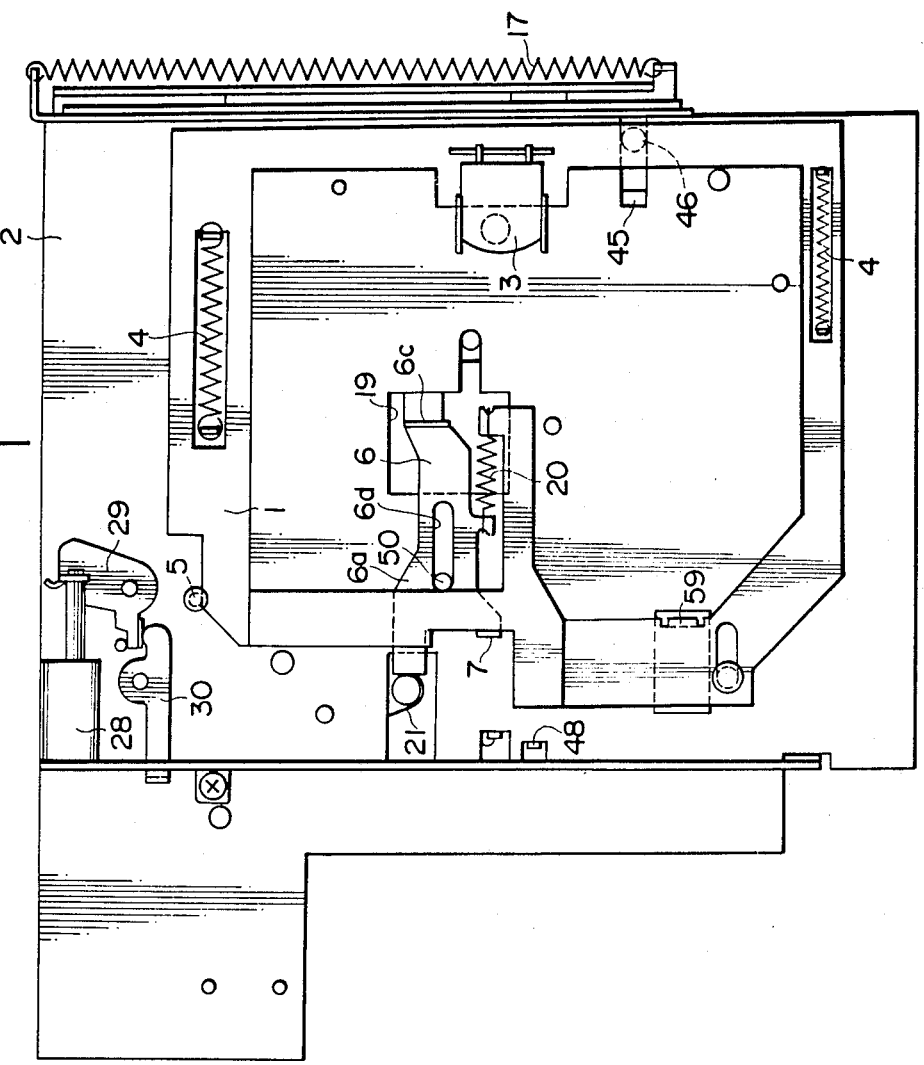

With this arrangement, when the cassette is loaded into the player being in the non-play state shown in FIGS. 9 and 10, the cassette holder (not shown) is moved to the play position and the second electromagnetic member 44 is energized, and at the same time the electromagnetic actuator 28 is temporarily actuated to pivotally move the first and second pivotal members 29 and 30, whereby the second lever 26 is moved forward as viewed in FIG. 2.

Consecutively, leftward movement of the first lever 25 as viewed in the drawing is effected so that the starting mechanism 23 comes into the operative state, which state is maintained by the fact that the lock plate 42 is attracted by the second electromagnetic member 44 through the attraction member 43, that is, the second lock mechanism is operated (see FIG. 11). The operation principles and structures of the starting mechanism 23 and the second lock mechanism 33 are exactly the same as those shown in the first embodiment, and therefore the detailed explanation thereof will be omitted.

Upon rotation of the notched gear 10 caused by the actuation of the starting mechanism 23, the slide member 18 is moved backward as viewed in the drawing, the engaging pin 35 comes in and engages with the engaging portion 34a of the slot 34, and the action plate 36 is moved leftward as viewed in the drawing. This backward movement state as viewed in the drawing of the slide member 18 is maintained by the operation of the third lock mechanism 320 which will be described hereinafter (see FIG. 11).

After the slide member 18 has been maintained in its backward state as described above, the notched gear 10 is continuously rotated, until it is disengaged from the transmission gear 11, and then stops. This stopped state is maintained by the fact that the starting mechanism 23 is locked by the second lock mechanism 33, as shown in FIG. 11. The operating process of coming into the aforesaid state is exactly similar to that of the case of the aforementioned first embodiment. Therefore, a further explanation will be omitted.

Subsequently, when, for example, an ejecting button is actuated to effect ejection from the play state shown in FIG. 11, the electric control circuit is cut off and the second electromagnetic member 44 is deenergized. Thereby, the locked state of the slide member 18 is released by a releasing operation of the third lock mechanism 320 described later and the state restrained from rotation of the notched gear 10 is also released by the releasing operation of the second lock mechanism 33. Then, the cassette holder is restored from its play position to its non-play position by utilizing the resilient force of the spring 17, together with the restoration of the slide member 18, and various mechanisms are also restored to their non-play state shown in FIGS. 9 and 10.

In the following, the operation of the aforesaid third lock mechanism 320 will be described in detail with reference to FIGS. 13A to 13C.

Figure 13:
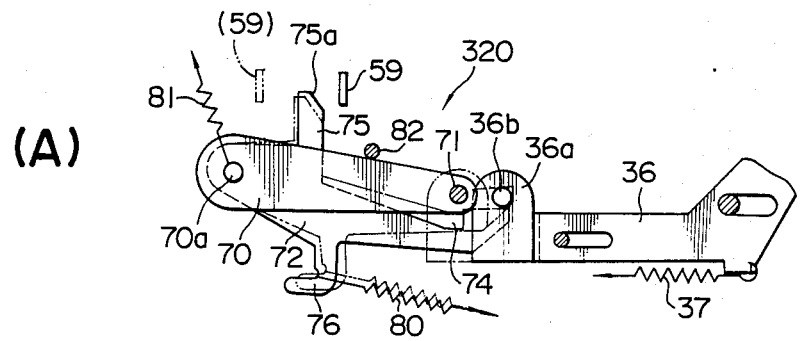
Figure 13:
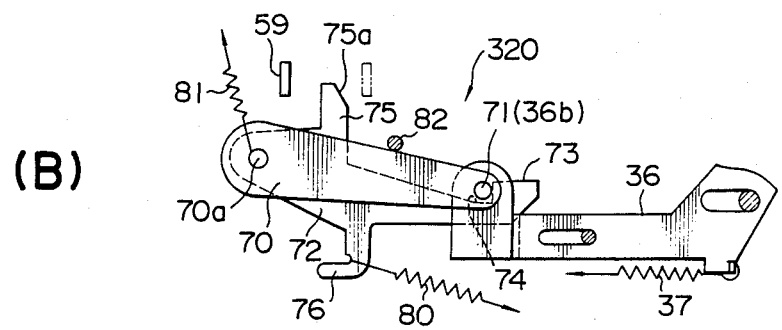
Figure 13:
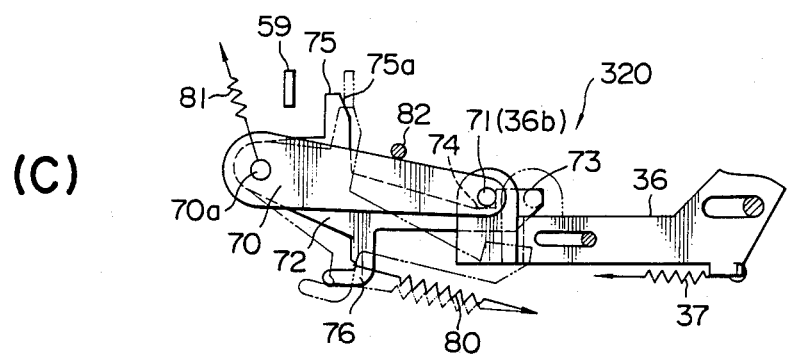

The non-play state is indicated by the solid line in FIG. 13A, and when the action plate 36 is moved leftward as viewed in the drawing from the non-play state, the pivot pin 36b is disengaged from the contact edge 73 and engaged with the engaging shoulder 74, as shown in the broken line in FIG. 13A, where the pivot pin 36b is positioned so as to be coaxial with the pivot shaft 71. Under this state of the action plate 36, the slide member 18 is maintained in its backward state. Subsequently, when the head plate 1 is moved from the aforesaid state toward the play position, the projection 59 provided thereon abuts against the inclined edge 75a of the action member 75, thus exerting a backward force on the operating member 72.

Then, the operating member 72 is rotated counterclockwise, as viewed in the drawing, against the biasing force of the spring 81, about the engaging portion between the pivot pin 36b and the engaging shoulder 74, and with this, the guide lever 70 is also pivotally moved in the same direction as the former about the pivot pin 36b to allow the passage of the projection 59, after which the guide lever 70 comes into the state shown in FIG. 13B.

Thereafter, when the head plate 1 is moved from the state shown in FIG. 13B toward the non-play position (rightward in the drawing), the projection 59 again abuts against the action member 75. Then, since the backward force acts on the operating member 72, the operating member 72 is pivotally moved clockwise about the pivot shaft 70a as shown by the broken line in FIG. 13C, whereby the engaging shoulder 74 is disengaged from the pivot pin 36b. Accordingly, the action plate 36 is moved rightward due to the fact that the engaging pin 35 is disengaged from the engaging portion 34a of the slide member 18 and moved rightward by the cassette returning spring 17. At the same time, the contact edge 73 of the operating member 72 comes into contact with the pivot 36b and returns to the non-play state as shown by the solid line in FIG. 13A.

While, in the above-described embodiment, a description has been made of the case where the operating state of the starting mechanism 23 actuated by the electromagnetic actuator 28 is locked by the second lock mechanism 33 to thereby restrain the rotation of the notched gear 10, that is, the case where a part of the starting mechanism is utilized so that the rotation of the notched gear 10 is restrained by the second lock mechanism 33, it is to be noted of course that the second lock mechanism 33 for restraining the rotation of the notched gear 10 can be independently constituted irrespective of the starting mechanism.

What is claimed is:

1. A head plate operating mechanism for a cassette tape player comprising:

a frame;

a head plate carrying magnetic head means and movably mounted on the frame for movement between non-play and play positions;

a transmission gear connected to be rotated when a tape cassette is loaded into the cassette tape player;

a notched gear engageable with the transmission gear and having gear teeth and a crank pin on a rotation surface thereof;

a starting mechanism for imparting a starting torque to the notched gear to rotate the notched gear so that a gear tooth adjacent to a notched portion of the notched gear approaches to and engages with the rotating transmission gear to thereby enable continued rotation of the notched gear by the rotating transmission gear, the starting mechanism being actuated when the tape cassette is loaded into the cassette tape player;

linkage means movably connected with the head plate and including a slide member slidably contactable with the crank pin of the notched gear to undergo displacement outwardly relative to the notched gear while the notched gear is being rotated by the rotating transmission gear, the slide member having means for releasing the head plate to allow movement of the head plate from the non-play position to the play position when the slide member has been moved by the crank pin;

first spring means for urging the slide member of the linkage means toward the notched gear, the biasing force of the first spring means being increased with displacement of the slide member by the crank pin;

first locking means for releasably locking the slide member in its position displaced by the crank pin;

controlling means for controlling the movement of the head plate between the non-play and play positions, the controlling means comprising a control member slidably contactable with the crank pin of the rotating notched gear so as to be moved outwardly relative to the notched gear by the crank pin after the slide member of the linkage means has been locked by the first locking means, and second spring means for resiliently connecting the control member and the head plate;

third spring means for urging the control member of the controlling means toward the notched gear, the biasing force of the third spring means being selected to allow the forced movement of the control member by the crank pin against the biasing force exerted by the third spring means; and second locking means for releasably locking the starting mechanism in its actuated state after the starting mechanism has imparted the starting torque to the notched gear and for releasably restraining the notched gear from undergoing rotation after the control member has carried the head plate to the play position and the notched portion of the notched gear has rotated to a position to release the engagement between the notched gear and the transmission gear.

2. A head plate operating mechanism according to claim 1; wherein the second locking means includes means for releasing the locking and restraining operation thereof when the cassette tape player comes into at least one of the ejecting operation, cassette tape quick-feed operation and cassette tape rewinding operation.

3. A head plate operating mechanism according to claim 1; wherein the starting mechanism comprises a first lever movable relative to the notched gear and having an action pin at one end thereof which projects perpendicular to and toward the rotation surface of the notched gear; a second lever movable relative to the first lever; a pivotal lever connecting the other end of the first lever and one end of the second lever for converting movement of the second lever to movement of the first lever; an electromagnetic actuator having a shaft which is temporarily actuated to move when the tape cassette is loaded into the cassette tape player; converting means connecting a free end of the shaft of the electromagnetic actuator and the other end of the second lever for converting the actuated movement of the shaft to movement of the second lever so that the first lever is moved to position the action pin thereof near the peripheral edge of the rotation surface of the notched gear; fourth spring means for urging the second lever and thereby urging the first lever through the pivotal lever to bias the action pin of the first lever toward the axis of rotation of the notched gear; and an abutting ridge formed on the peripheral edge of the rotation surface of the notched gear and having a side surface slidably abuttable against the action pin so that a moving force applied to the first lever by energizing the electromagnetic actuator is partially converted to the starting torque for rotating the notched gear.

4. A head plate operating mechanism according to claim 1; wherein the linkage means includes an engaging portion protruding downward from the head plate through an elongated hole formed in the frame, the elongated hole being configured to allow movement of the engaging portion therein corresponding to the movement of the head plate from the non-play position to the play position, and means mounting the slide member for sliding movement in a direction perpendicular to the elongated hole of the frame and parallel to the rotation surface of the notched gear, the slide member having a an edge slidably abuttable against the crank pin of the rotating notched gear, and opening means for movably receiving therein the engaging portion of the head plate, the opening means being operative to allow the movement of the slide member by the crank pin while the engaging portion remains at a position corresponding to the non-play position of the head plate and also to allow movement of the engaging portion to a position corresponding to the play position of the head plate when the slide member has been moved by the crank pin.

5. A head plate operating mechanism according to claim 1; wherein the controlling means includes a pivotal lever having an end thereof slidably abuttable against the control member and the other end thereof connected to an urged by the third spring means for transmitting the biasing force of the third spring means to the control member to thereby bias the control member toward the notched gear; and a setting member disposed on the frame for restraining the head plate to be definitely set in its play position.

6. A head plate operating mechanism according to claim 3; wherein the second locking means comprises a lock plate which overlaps with the second lever of the starting mechanism and is movable perpendicular to the direction of movement of the second lever; and electromagnetic member disposed adjacent to an end of the lock plate and energized when the tape cassette is loaded into the cassette tape player; an attraction member fixed to the end of the lock plate and magnetically attracted to the energized electromagnetic member; and first connecting means for releasably connecting the lock plate and the second lever, the first connecting means being operative to allow the lock plate to be attracted by the energized electromagnetic member separately from the second lever when the second lever has been actuated to move by the electromagnetic actuator, and operative to releasably fix the actuated second lever to the lock plate when the lock plate is held in its attracted position.

7. A head plate operating mechanism according to claim 3; wherein the notched gear has first and second protrusions disposed in spaced-apart relationship on the rotation surface of the notched gear for engaging the action pin of the first lever of the starting mechanism to releasably restrain the notched gear from undergoing rotation, the engagements of the first and second protrusions with the action pin being carried out while the starting mechanism remains in its non-actuated state and while the starting mechanism is locked in its actuated state by the second locking means, respectively.

8. A head plate operating mechanism according to claim 1; wherein the first locking means comprises an action plate urged by fifth spring means; second connecting means for connecting the action plate and the slide member of the linkage means, the second connecting means being operative to allow the action plate to be moved by the biasing force of the fifth spring means when the slide member has been moved by the crank pin of the rotating notched gear; a guide lever pivotally connected at one end thereof to the frame; a projection protruding downward from the head plate through a hole formed in the frame and elongated in the moving direction of the head plate between the non-play and play positions; a shaft pin disposed on the action plate; and an operating member pivotally connected at an end thereof to the opposite end of the guide lever and releasably engaged at the other end thereof with the shaft pin when the action plate has been moved by the fifth spring means, the operating member being slidably abuttable against the projection of the head plate (a) a pivot, in one direction of rotation, around a portion of the operating member engaged with the shaft pin to thereby enable the projection to move further away when the head plate is moved from the non-play position to the play position and also (b) to pivot, in the other direction of rotation, around a portion of the operating member pivotally connected with the guide lever to thereby release engagement of the operating member with the shaft pin when the head plate is moved from the play position to the non-play position.

9. A head plate operating mechanism according to claim 8; wherein the operating member of the first locking means further has, at the other end thereof, a contacting edge slidably contactable with the shaft pin of the action plate when the action plate is kept free from its displacement by the fifth spring means, and an engaging shoulder releasably engageable with the shaft pin when the action plate has ben moved by the fifth spring means, and also has, in the intermediate portion thereof, an action member having an inclined edge slidably contactable with the projection of the head plate when the head plate is moved from the non-play position to the play position; and wherein the shaft pin is coaxially superposed on a pivot shaft by which the guide lever is pivotally connected to the frame.

* * * * *